United States Patent
Neidrich et al.

(10) Patent No.: US 7,808,449 B2
(45) Date of Patent: Oct. 5, 2010

(54) METHOD AND SYSTEM FOR MULTI-CHANNEL VIEWING APPLICATIONS

(75) Inventors: Jason M. Neidrich, Fairview, TX (US); Matthew G. Hine, Richardson, TX (US); Lisa A. Wesneski, The Colony, TX (US)

(73) Assignee: Texas Instruments Incorporated, Dallas, TX (US)

( * ) Notice: Subject to any disclaimer, the term of this patent is extended or adjusted under 35 U.S.C. 154(b) by 873 days.

(21) Appl. No.: 11/648,424

(22) Filed: Dec. 29, 2006

(65) Prior Publication Data

US 2008/0158095 A1    Jul. 3, 2008

(51) Int. Cl.
G09G 5/00    (2006.01)

(52) U.S. Cl. .............. 345/6; 348/E13.04; 348/E13.046; 348/E13.059

(58) Field of Classification Search .............. 345/6, 345/7–9; 348/564, 52, 53, 56, 588
See application file for complete search history.

(56) References Cited

U.S. PATENT DOCUMENTS

| | | | |
|---|---|---|---|
| 6,188,442 B1 * | 2/2001 | Narayanaswami | 348/564 |
| 6,954,185 B2 * | 10/2005 | Ogino | 345/7 |
| 7,331,929 B2 | 2/2008 | Morita et al. | |
| 7,474,276 B2 * | 1/2009 | Endo et al. | 345/7 |
| 2003/0067554 A1 | 4/2003 | Klarfeld et al. | |
| 2005/0088366 A1 | 4/2005 | Fujio et al. | |
| 2005/0117016 A1 | 6/2005 | Surman | |
| 2006/0028394 A1 | 2/2006 | Love et al. | |
| 2006/0247049 A1 | 11/2006 | Noro et al. | |
| 2006/0285026 A1 * | 12/2006 | Robinson | 349/15 |
| 2007/0069977 A1 | 3/2007 | Adderton | |
| 2007/0081125 A1 | 4/2007 | Lewis | |
| 2008/0106488 A1 | 5/2008 | Okuno | |

OTHER PUBLICATIONS

Elliott, Keith H. et al, "Method and System of communicating and rendering Stereoscopic and Dual-View Images," U.S. Appl. No. 11/647,819, filed Dec. 29, 2006, 25 pages.

* cited by examiner

*Primary Examiner*—Kevin M Nguyen
(74) *Attorney, Agent, or Firm*—Warren L. Franz; Wade J. Brady, III; Frederick J. Telecky, Jr.

(57) ABSTRACT

Methods and apparatus for rendering plural channels on a common display are provided. In a method embodiment, a method for allowing sharing of a display by a plurality of users wishing to view a plurality of respective images includes displaying the plurality of respective images sequentially on the display. The method further includes selectively allowing the respective image to be viewed by the respective user, but not by any other of the plurality of users.

16 Claims, 1 Drawing Sheet

METHOD AND SYSTEM FOR MULTI-CHANNEL VIEWING APPLICATIONS

TECHNICAL FIELD

This disclosure relates in general to display systems and, in particular, to display systems having selective viewing of multi-channel outputs.

BACKGROUND

A display technique known as split screen allows the simultaneous presentation of (usually) related image and textual information on a single display. A split screen display typically consists of two to four non-movable adjacent viewing areas that simultaneously display viewing content. Video game applications commonly use split screen displays to allow multi-player gaming using a common viewing screen. However, split screen displays are limited for a variety of reasons.

Several display techniques render display information visible only to a particular viewer. For example, some privacy filters made of treated glass, plastic, or liquid crystal may be positioned in front of a computer monitor to make on-screen information visible only to a person sitting directly in front of the monitor. However, such display techniques are limited for a variety of reasons.

SUMMARY OF THE EXAMPLE EMBODIMENTS

In one embodiment, an apparatus for use with a display system includes a plurality of eyewear devices and a processor communicatively coupled to each of the plurality of eyewear devices. The processor is operable to provide a signal to each eyewear device that directs the eyewear device to allow a wearer of the eyewear device to view a display during a particular time period, but not view the display during all other time periods. In this manner, a plurality of users of the plurality of eyewear devices may view different images on a same display device generally concurrently.

In a method embodiment, a method for allowing sharing of a display by a plurality of users wishing to view a plurality of respective images includes displaying the plurality of respective images sequentially on the display. The method further includes selectively allowing the respective image to be viewed by the respective user, but not by any other of the plurality of users.

Technical advantages of some embodiments of the invention may include methods and systems capable of presenting any number of full-resolution channels virtually simultaneously to a common viewing display. In addition, various embodiments may privatize the perceptibility of any particular channel for receipt only by those wearing corresponding eyewear. Various embodiments may privatize the perceptibility of one or more independent channels, while presenting a neutral screen to all onlookers.

It will be understood that the various embodiments of the present disclosure may include some, all, or none of the enumerated technical advantages. In addition other technical advantages of the present disclosure may be readily apparent to one skilled in the art from the figures, description, and claims included herein.

BRIEF DESCRIPTION OF THE DRAWINGS

For a more complete understanding of the present disclosure and features and advantages thereof, reference is now made to the following description, taken in conjunction with the accompanying drawings, in which.

DESCRIPTION OF EXAMPLE EMBODIMENTS

In accordance with the teachings of the present disclosure, a method and system for rendering plural channels on a common display are provided. Various embodiments may privatize the perceptibility of a particular channel to one or more viewers. Some embodiments may effect this privatization by synchronizing the operation of eyewear with the display of the particular channel. Particular examples specified throughout this document are intended for example purposes only, and are not intended to limit the scope of the present disclosure.

Figure 1:
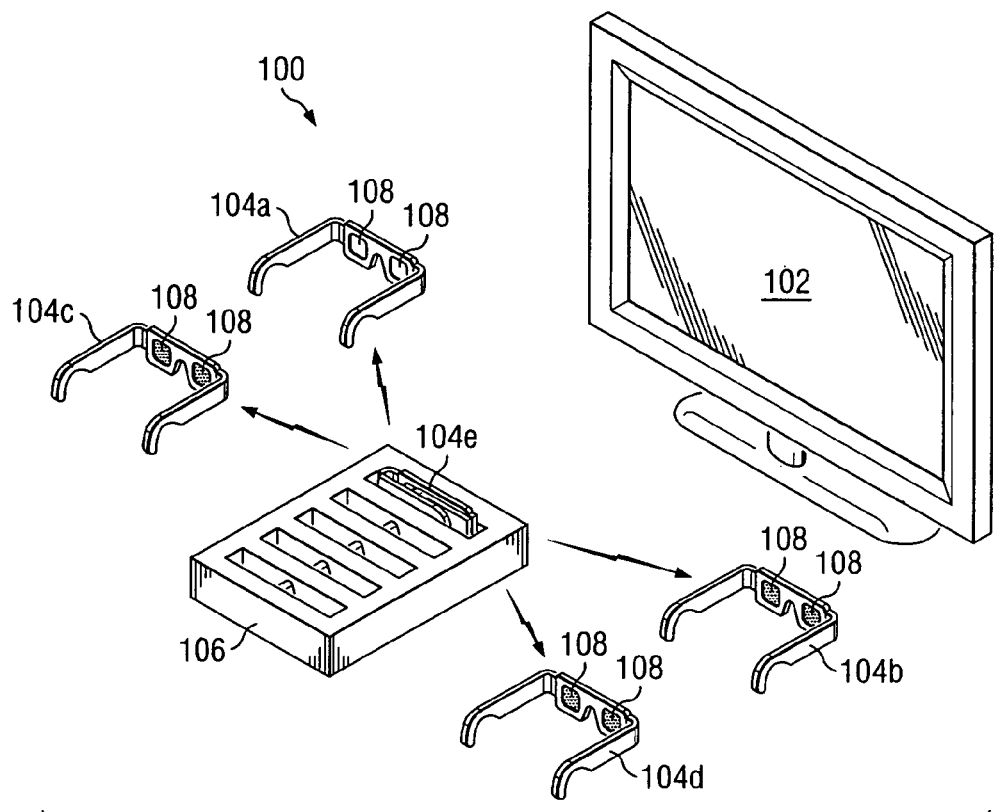
FIG. 1 is a block diagram of a portion of an example multi-channel display system according to the teachings of one embodiment of the present disclosure.

FIG. 1 is a block diagram of an example multi-channel display system 100 according to the teachings of one embodiment of the present disclosure. In the example embodiment, system 100 is generally capable of controlling the perceptibility of plural full-resolution channels displayed in rapid sequence on a common display 102. A cradle 106 synchronizes the operation of a set of eyewear 104 with the channels presented on display 102. In operation of various embodiments, system 100 may enable applications such as multi-player gaming by providing each player with a unique, full-resolution, and private viewing perspective using a display 102 common to all players.

Display 102 generally refers to any suitable display surface, such as, for example, a television screen, a computer screen, a projector screen, or a wall. In the example embodiment, display 102 is capable of receiving the optical rendering of plural full-resolution channels. In some embodiments, system 100 may support any of a variety of full-resolutions rendered on display 102. For example, system 100 may support 640×480 p (PC gaming), 800×600 p (PC gaming), 1280×720 p (PC, Broadcast), 1024×768 p (PC Gaming), 1280×800 p (PC Gaming), 1280×1024 p (PC Gaming), 1400×900 p (iMac Gaming), 1600×1200 p (PC Gaming), 1680×1050 p (iMac Gaming), 1920×1080 p (PC Broadcast) etc.

In this particular embodiment, the channels of a particular multi-player video game may provide four unique, full-resolution viewing perspectives to respective players. These viewing perspectives may be communicated to display 102 in repeating sequential order using time-division multiplexing. That is, the time domain may be divided into several recurrent timeslots of fixed length, one timeslot for each channel. In this manner, display 102 presents only one of the viewing perspectives at any given point in time. If the timeslots are sufficiently rapid, a non-player observer may not be able to distinguish any one particular channel or viewing perspective presented on display 102 without wearing corresponding eyewear 104.

Eyewear 104 generally refers to any device operable to control channel perceptibility. In the example embodiment, the time-sequenced selectivity of eyewear 104 may be effected by any of variety of means. For example, eyewear 104 may each include liquid crystal lenses 108 that pass light from display 102 in synchronization with a respective channel. As illustrated in FIG. 1, eyewear 104a may pass light to a first viewer's eyes while display 102 presents the first viewer's channel. During this same timeslot, eyewear 104b, 104c, and 104d may block the light from display 102. If the sequenced timeslots are sufficiently rapid, each viewer may perceive a seamless and steady viewing perspective, even though each eyewear 104a, 104b, 104c, and 104d passes light only a fraction of the total time domain.

Various display technologies are capable of supporting timeslots sufficiently rapid to generate virtually seamless viewing perspectives of four or more channels on a common display 102. For example, display systems driven by image rendering engines such as, for example, DLP® digital micromirror devices of Texas instruments Incorporated may efficiently operate in the low microsecond range.

Each eyewear 104 may include labeling indicating assignment of a particular channel. In an alternative embodiment, each eyewear 104 may include a switch that allows a user to select between available channels. As shown in FIG. 1, an additional eyewear set 104e is docked in cradle 106.

Cradle 106 generally refers to any device operable to synchronize the operation of eyewear 104 with the channels presented on display 102. In the example embodiment, the synchronization is effected in part by a processor (not explicitly shown) housed within cradle 106 and associated logic stored within cradle 106. In various embodiments, cradle 106 may communicate via wireless to eyewear 104. The wireless communication may be effected, for example, by infrared, radio waves, or Bluetooth technologies. In the example embodiment, cradle 106 also serves as a docking station for eyewear 104. In some such embodiments, cradle 106 may recharge eyewear 104 while they are docked.

In some embodiments, each channel may include stereoscopic subchannels for three-dimensional (3D) presentations on display 102. For example, the stereoscopic subchannels may be presented superimposed onto display 102 using, for example, orthogonal polarizing filters or circular polarizing filters. In such embodiments, the left and right lenses 108 of each eyewear 104 may be oppositely polarized to present stereoscopic perspectives to the left and right eye simultaneously, thereby giving the illusion of three-dimensional depth.

In other embodiments the stereoscopic subchannels may use alternate frame sequencing. In such embodiments, the left and right lenses 108 of eyewear 104 may alternate letting light through during the display of respective stereoscopic subchannel frames of a particular channel.

In an alternative embodiment, two channels, or "dual channels," may be presented superimposed onto display 102 using, for example, orthogonal polarizing filters or circular polarizing filters. In such embodiments, eyewear 104 may be grouped into pairs with each unit having lenses 108 oppositely polarized from its mate. Using circular polarization for illustrative purposes, eyewear 104a may be paired with eyewear 104b such that both lenses 108 of eyewear 104a pass left-circularly polarized light while extinguishing right-circularly polarized light. At the same time, eyewear 104b may pass right-circularly polarized light while extinguishing left-circularly polarized light.

In this manner, each eyewear 104 may filter the viewing perspective of one particular channel even though two channels are presented on display 102 at any given time. In some such embodiments, eyewear 104 may be operable to filter dual channels while performing time-division multiplexing, thereby enabling applications requiring more than two channels. Such embodiments may increase the efficiency of system 100, including, for example, enabling a greater number of channels or increasing the presentation quality for the same number of channels compared to non-paired eyewear 104 systems.

Conventional techniques to display multiple channels simultaneously, such as split screens, are limited for a variety of reasons. For example, in gaming applications, the size of each split screen viewing area is typically a function of the number of players. Consequently, most multi-player gaming applications using a common display have a maximum of four players. In addition, typical split-screen applications inefficiently or unequally use the common display unless the number of channels is a factor of two. Another limitation is that the split screens typically allow each player to view all viewing areas, thereby inhibiting an element of privacy or surprise.

Accordingly, the teachings of the present disclosure recognize methods and systems capable of presenting any number of full-resolution channels "simultaneously" to a common viewing display 102. In addition, various embodiments may privatize the perceptibility of any particular channel for receipt only by those wearing corresponding eyewear 104. In certain applications, such as, for example, multi-player gaming, the privatization of full-resolution channels may significantly enhance the gaming experience.

Although the present disclosure has been described with reference to multi-player gaming applications, the teachings of the present disclosure apply to any number of other applications. For example, passengers on an airplane may wish to select from any of a number of movies "simultaneously" presented on display 102. Each movie may have a corresponding soundtrack that can be provided to passengers through private headsets.

In another example, a user may select at will between any of a variety of available viewing perspectives, such as, for example, between multiple camera angles of a sporting event. In some such embodiments, the user selection may control the synchronization of eyewear 104 to the presentation of a particular one of the multiple camera angles, all of which are sequentially presented on a common viewing display 102.

In yet another example, a user may wish control the visualization of multiple channels such that two or more channels are visually overlaid. In some such embodiments, eyewear 104 may be synchronized to provide light to a user's eyes from two or more channels presented on a common display 102, such as, for example, from two or more channels representing interrelated graphical data for engineering analysis.

Figure 2A:
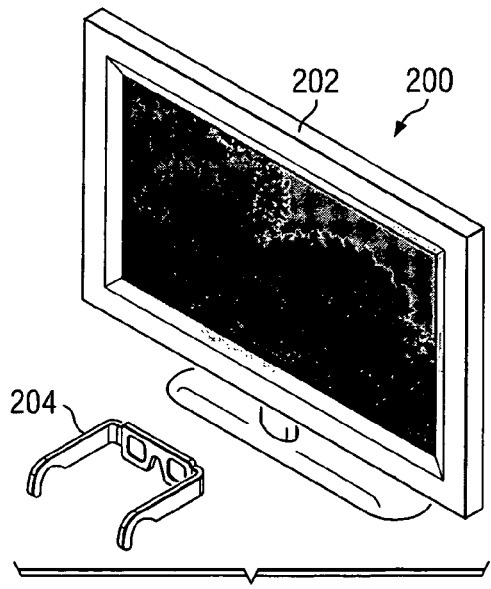
FIGS. 2A and 2B are block diagrams of a portion of an example private display system according to the teachings of an alternative embodiment of the present disclosure.
Figure 2B:
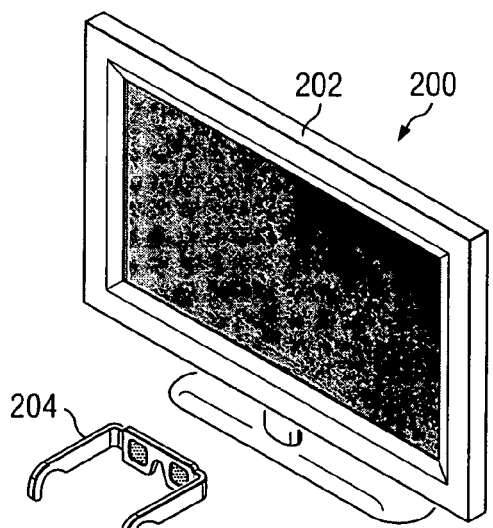

In an alternative example application, a single user may wish to privatize visual information presented on display 102 that might otherwise be visible to others, as described further with reference to FIGS. 2A and 2B.

FIGS. 2A and 2B are block diagrams of a portion of an example private display system 200 according to the teachings of an alternative embodiment of the present disclosure. In this particular embodiment, system 200 is generally capable of privatizing the perceptibility of one or more channels by synchronizing their presentation on display 202 with the operation of a set of eyewear 204. Display 202 and eyewear 204 are substantially similar in structure and function to display 102 and eyewear 104 of FIG. 1 respectively.

In the example embodiment, a processor (such as, for example, the processor housed in cradle 106 of FIG. 1) is operable to generate an encoded channel such that every main channel frame is followed by its photographic negative. As illustrated in FIG. 2A, eyewear 204 is synchronized to pass light from display 202 to a user's eyes during the presentation of a primary channel or "positive" frame. Eyewear 204 then blocks light from display 202 to a user's eyes during the subsequent presentation of a photographic negative of the positive frame, as illustrated in FIG. 2B.

In various embodiments, the positive and negative frames may each have a 50% duty cycle. In this manner, the presentation of the encoded channel on display 202 would appear as a flat grey field to "onlookers" not wearing appropriately synchronized eyewear 204. Various applications may benefit from having a flat grey field rather than random visual noise, which might be distracting or even disturbing to onlookers.

Other embodiments may have various other positive and negative duty cycles. For example, the positive and negative frames of an encoded channel may split a 66% and 33% duty cycle respectively. Such embodiments may maintain a flat grey field, from an onlooker perspective, by pulsing the negative frames twice as bright as the positive frames. In some embodiments, increasing the positive duty cycle may reduce image "flickering."

In an alternative embodiment, multiple private channels may be presented to display 202. For example, a processor may generate an encoded channel from two independent channels. The encoded channel may sequence through a positive frame of the first channel, a positive frame of the second channel, and then a photographic negative of a summation of the two preceding positive frames. Displaying each of the frames at appropriate brightness levels may maintain a flat grey field from an onlooker perspective. Multiple eyewear 204 may be synchronized to a particular one of the two independent channels using principles described above. These generalized principles can be expanded to any number of channels given a fast enough image-rendering engine and corresponding eyewear.

Conventional privacy filters positioned in front of display devices, such as computer monitors, commonly fail to completely privatize visual information. In addition, conventional privacy filters typically do not easily provide the privatized visual information to multiple viewers. Accordingly, the teachings of the present disclosure recognize methods and systems for privatizing the display of one or more independent channels for potentially multiple users, while presenting a neutral screen to all onlookers.

Although the present disclosure has been described in several embodiments, a myriad of changes, variations, alterations, transformations, and modifications may be suggested to one skilled in the art, and it is intended that the present disclosure encompass such changes, variations, alterations, transformations, and modifications as falling within the spirit and scope of the appended claims.

What is claimed is:

1. A display system, comprising:
a display device operable to simultaneously display in different polarizations, during successive time periods, sequentially alternating different ones of left or right eye stereoscopic perspective subchannel images of respective first and second image channels;
first and second eyewear devices, each comprising left and right lenses with respective filters for the different polarizations; and
a processor communicatively coupled to the eyewear devices and operable to control the eyewear devices to sequentially pass or block light through sequentially alternating different ones of the left and right lenses during the successive time periods in synchronization with the display device; so that the first eyewear device will pass a left eye stereoscopic perspective subchannel image of the first image channel displayed by the display device when the second eyewear device will pass a right eve stereoscopic perspective subchannel image of the second image channel displayed by the display device, and the first eyewear device will pass a right eye stereoscopic perspective subchannel image of the first image channel displayed by the display device when the second eyewear device will pass a left eye stereoscopic perspective subchannel image of the second image channel displayed by the display device; thereby enabling users of the first and second eyewear devices to simultaneously view different stereoscopic first and second channel images on the same display device.

2. The display system of claim 1, wherein the different stereoscopic first and second channel images on the same display device correspond to different images of a multi-player video game.

3. The display system of claim 1, further comprising a plurality of headsets each operable to provide sound corresponding to a particular one of the different stereoscopic first and second channel images on the same display device.

4. The display system of claim 1, further comprising a cradle, the cradle having a plurality of docking stations each operable to dock a respective one of the eyewear devices.

5. The display system of claim 4, wherein the cradle is further operable to charge the docked eyewear devices.

6. The display system of claim 4, wherein the cradle is coupled to the processor.

7. The display system of claim 1, further comprising a switch operable to control which of the different stereoscopic first and second channel images on a same display device a particular one of the plurality of users may view.

8. The display system of claim 1, wherein the display device is operable to simultaneously display in different polarizations, during the successive time periods, the sequentially alternating different ones of left or right eye stereoscopic perspective subchannel images of the respective first and second image channels; and the first and second eyewear devices, each comprise left and right lenses with filters corresponding to the respective different polarizations.

9. A display system, comprising:
a processor operable to:
receive an image; and
display each of the received image and an optical negative of the image in a time period such that the received image is not perceptible to the human eye; and
one or more eyewear devices each operable to selectively filter the negative image such that the received image is perceptible to the human eye by allowing light to pass through the eyewear devices when the received image is displayed and not pass light when the optical negative of the image is displayed.

10. The display system of claim 9, wherein the received image is a stereoscopic image that is perceptible to the human eye as three-dimensional.

11. The display system of claim 9, wherein the processor is further operable to display each of the received image and an optical negative of the image in a time period such that the human eye perceives a substantially solid color.

12. The display system of claim 11, wherein the substantially solid color is a shade of grey.

13. A method for allowing sharing of a display by a plurality of users wishing to view a plurality of respective images, comprising:
displaying the plurality of respective images sequentially on the display; and
selectively allowing the respective image to be viewed by the respective user, but not by any other of the plurality of users
automatically generating an optical negative image of the respective image to be viewed by the respective user;

displaying the generated optical negative image; and not allowing the displayed optical negative image to be viewed by the respective user.

14. A method for enabling simultaneous viewing of different stereoscopic first and second channel images on a common display device, comprising:

operating the display device to simultaneously display, during successive time periods, sequentially alternating different ones of left or right eye stereoscopic perspective subchannel images of respective first and second image channels;

providing first and second eyewear devices, each comprising left and right lenses; and controlling the eyewear devices to sequentially pass or block light through sequentially alternating different ones of the left and right lenses during the successive time periods in synchronization with the operating of the display device; so that the first eyewear device passes a left eye stereoscopic perspective subchannel image of the first image channel displayed by the display device when the second eyewear device passes a right eye stereoscopic perspective subchannel image of the second image channel displayed by the display device, and the first eyewear device passes a right eye stereoscopic perspective subchannel image of the first image channel displayed by the display device when the second eyewear device passes a left eye stereoscopic perspective subchannel image of the second image channel displayed by the display device.

15. The method of claim 14, wherein the first and second channel images correspond to respective first and second video streams of a multi-player video game.

16. The method of claim 14, wherein the display device is operated to simultaneously display in different polarizations, during the successive time periods, the sequentially alternating different ones of left or right eye stereoscopic perspective subchannel images of the respective first and second image channels; and the first and second eyewear devices each comprise left and right lenses with filters corresponding to the respective different polarizations.

* * * * *